US011953442B2

(12) United States Patent
Williams et al.

(10) Patent No.: US 11,953,442 B2
(45) Date of Patent: Apr. 9, 2024

(54) COLLOIDAL GOLD NANOPARTICLES ON ANODIC ALUMINA OXIDE SUBSTRATES FOR SURFACE-ENHANCED RAMAN SCATTERING

(71) Applicant: Salvo Technologies, Inc., Largo, FL (US)

(72) Inventors: Lenzi Williams, Clearwater, FL (US); Abdeljabbar R. Khamis, Cutler Bay, FL (US); Hugh Garvey, Seminole, FL (US); John Dougherty, Pinellas Park, FL (US)

(73) Assignee: Salvo Technologies, Inc., Largo, FL (US)

( * ) Notice: Subject to any disclaimer, the term of this patent is extended or adjusted under 35 U.S.C. 154(b) by 136 days.

(21) Appl. No.: 17/888,640

(22) Filed: Aug. 16, 2022

(65) Prior Publication Data
US 2023/0056483 A1    Feb. 23, 2023

Related U.S. Application Data

(60) Provisional application No. 63/234,743, filed on Aug. 19, 2021.

(51) Int. Cl.
*G01N 21/65* (2006.01)
*C25D 11/24* (2006.01)

(52) U.S. Cl.
CPC .......... *G01N 21/658* (2013.01); *C25D 11/24* (2013.01)

(58) Field of Classification Search
CPC ..................................... C25D 11/24
See application file for complete search history.

(56) References Cited

U.S. PATENT DOCUMENTS

2006/0034729 A1*  2/2006  Poponin ............... G02B 5/204
                                                  422/82.05

FOREIGN PATENT DOCUMENTS

CN         107937957        *  4/2018

* cited by examiner

*Primary Examiner* — Nathan T Leong
(74) *Attorney, Agent, or Firm* — Dennis L. Cook, Esq.

(57) ABSTRACT

The preparation and colloidal gold nanoparticles deposited using a wet-chemical, three-phase ligand-exchange procedure carried out at room temperature on anodic alumina oxide to enhance detection of materials using Surface-enhanced Raman Scattering (SERS) is disclosed.

1 Claim, 5 Drawing Sheets

| Key |
|---|
| 1. Polystyrene Assembly container lid |
| 2. Gold Nanoparticle Concentrate (Water Phase) |
| 3. Organic (Oil) Phase |
| 4. Aluminum base layer |
| 5. Polystyrene Assembly Container Bottom |
| 6. Nanoporous Alumina Layer |
| 7. Air Phase |
| 8. Ethanol Injection Site |
| 9. Triple Vent |

| Key |
|---|
| 1. Hydroxyl Group |
| 2. Nanopore |
| 3. Nanoporous Alumina Layer |
| 4. Reflective Alumina Nanocavity |
| 5. Aluminum Layer Base |

Scanning electron microscope (SEM) image of the NAAO surface structure.

Cross-sectional view SEM image of NAAO substrate

COLLOIDAL GOLD NANOPARTICLES ON ANODIC ALUMINA OXIDE SUBSTRATES FOR SURFACE-ENHANCED RAMAN SCATTERING

CROSS-REFERENCE TO RELATED APPLICATION

The present application claims the benefit of previously filed Provisional Patent Application, Ser. No. 63/234,743 filed on Aug. 19, 2021.

FIELD OF THE INVENTION

The method of this disclosure belongs to the field of Raman Scattering spectroscopy. More specifically it is the use of colloidal gold nanoparticles deposited on anodic alumina oxide substrates for Surface-enhanced Raman Scattering.

BACKGROUND OF THE INVENTION

Raman spectroscopy is a form of vibrational spectroscopy, much like infrared (IR) spectroscopy. However, whereas IR bands arise from a change in the dipole moment of a molecule due to an interaction of light with the molecule, Raman bands arise from a change in the polarizability of the molecule due to the same interaction. This means that these observed bands (corresponding to specific energy transitions) arise from specific molecular vibrations. When the energies of these transitions are plotted as a spectrum, they can be used to identify the molecule as they provide a "molecular fingerprint" of the molecule being observed. Certain vibrations that are allowed in Raman are forbidden in IR, whereas other vibrations may be observed by both techniques, although at significantly different intensities, thus these techniques can be thought of as complementary.

Since the discovery of the Raman effect in 1928 by C. V. Raman and K. S. Krishnan, Raman spectroscopy has become an established, as well as a practical, method of chemical analysis and characterization applicable to many different chemical species.

Surface-enhanced Raman spectroscopy, or surface-enhanced Raman scattering (SERS), is a surface-sensitive technique that enhances Raman scattering by molecules adsorbed on rough metal surfaces or by nanostructures such as plasmonic-magnetic silica nanotubes. The enhancement factor can be as much as $10^{10}$ to $10^{11}$, which means the technique may detect single molecules. Surface-enhanced Raman scattering (SERS) is the Raman scattering from a compound (or ion) adsorbed on, or even within, a few Angstroms of a structured metal surface can be $10^3$-$10^6 \times$ greater than in solution. This surface-enhanced Raman scattering is strongest on silver, but is observable on gold and copper as well for common excitation sources. At practical excitation wavelengths, enhancement on other metals is unimportant.

BRIEF SUMMARY OF THE INVENTION

The method of this invention uses colloidal gold nanoparticles deposited on anodic alumina oxide for Surface-Enhanced Raman Scattering (SERS-AAOs).

BRIEF DESCRIPTION OF THE DRAWINGS

For a fuller understanding of the nature and objects of the invention, reference should be made to the following detailed description, taken in connection with the accompanying drawings, in which.

DESCRIPTION OF THE PREFERRED EMBODIMENT

Figure 4:
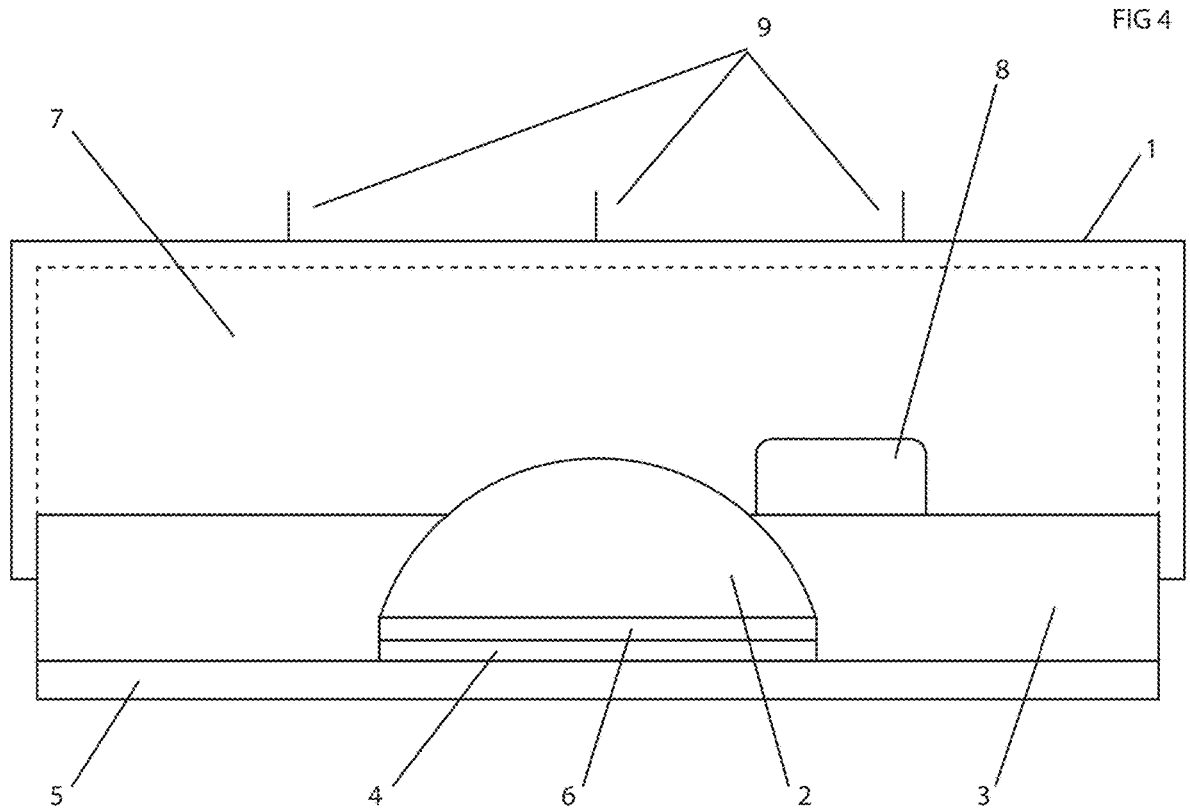
FIG. 4 shows the preferred embodiment's three-phase assembly mechanism.

The fabrication of SERS-NAAO substrates of this disclosure is based on an inexpensive wet chemical approach that is well known by those skilled in the art, which is used to develop gold layers directly onto NAAO substrates. As shown in FIG. 4 a three-phase system comprised of air/water/organic interfaces promotes the self-assembly and migration of gold nanoparticles into a two-dimensional thin film structure upon the addition of a cosolvent. The formation mechanism involves injecting ethanol at the water/organic interface which induces the gold nanoparticles diffuse to this interface where an in-situ ligand exchange passivation temporarily traps the nanoparticles. Next, the ligand-exchanged nanoparticles migrate to the air/water interface, where they self-assemble to form a gold monolayer on top of the NAAO substrate. The new ligand helps reduce the electrostatic repulsion, by controlling the interparticle separation between the nanoparticles, therefore causing the formation of the gold layer. (ye, Ziwei & Li, Chunchun & Chen, Qinglu & Xu, Yikai & Bell, Steven. (2021). Self-Assembly of Colloidal Nanoparticles into 2D Arrays at Water-Oil Interfaces: Rational Construction of Stable SERS Substrates with Accessible Enhancing Surfaces and Tailored Plasmonic Response. Nanoscale. 13. 10.1039/D0NR08803J. Reincke, Francois & Hickey, Stephen & Kegel, Willem & Vanmaekelbergh, Daniel. (2004). Spontaneous Assembly of a Monolayer of Charged Gold Nanocrystals at the Water/Oil Interface. Angewandte Chemie (International ed. in English). 43. 458-62. 10.1002/anie.200352339. Yang, Guang & Hallinan Jr, Daniel. (2016). Gold Nanoparticle Monolayers from Sequential Interfacial Ligand Exchange and Migration in a Three-Phase System. Scientific Reports. 6. 35339. 10.1038/srep35339).

For a laser cut NAAO substrate the aqueous nanoparticle layer was established by pipetting microliters of the concentrate onto a single NAAO substrate which was placed in a vented disposable petri dish. After depositing the concentrate, milliliter amounts of a dodecylamine hexane (μM) solution were slowly added to the petri dish to submerge a portion of the concentrate droplet but allow the droplet to protrude forming an air/water/hexane interface. Using a sterile syringe, microliter amounts of ethanol were injected (1 drop/20 s) at the water/hexane interface to induce gold layer formation. The wet substrates dried overnight before use in SERS measurements.

Figure 5:
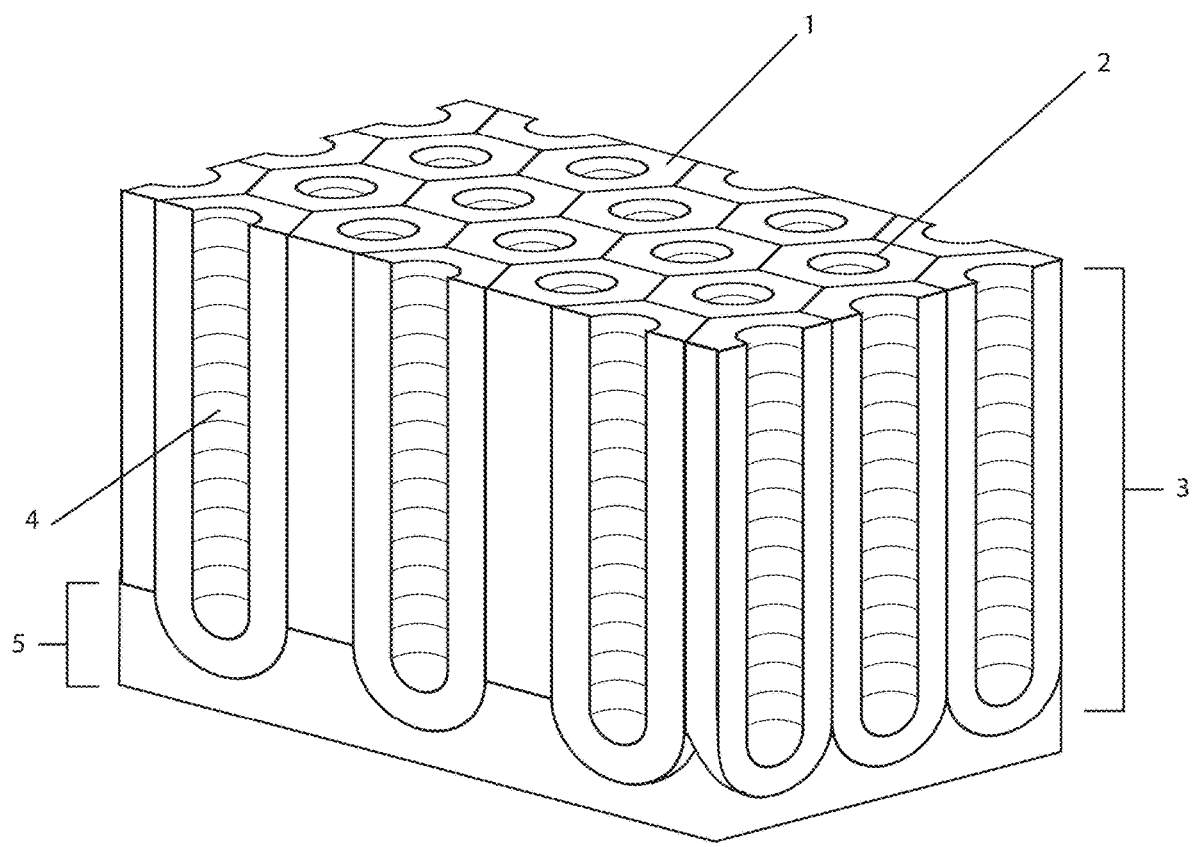
FIG. 5 shows the preferred embodiment's nanoporous anodic aluminum oxide substrate layers; and, FIG. 6 shows scanning electron microscope (SEM) images of the preferred embodiment's NAAO structure.
Figure 6:
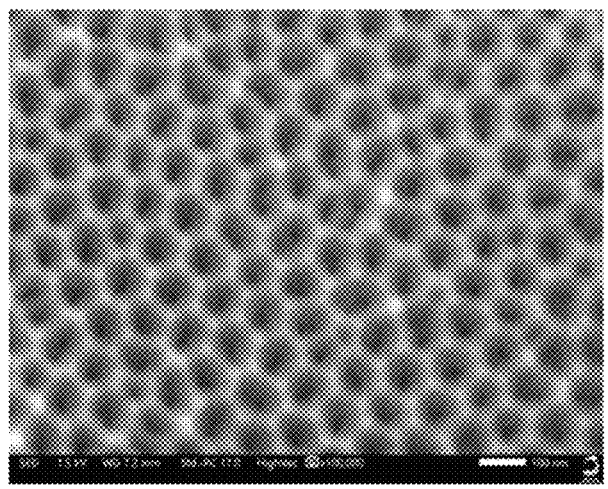
Figure 6:
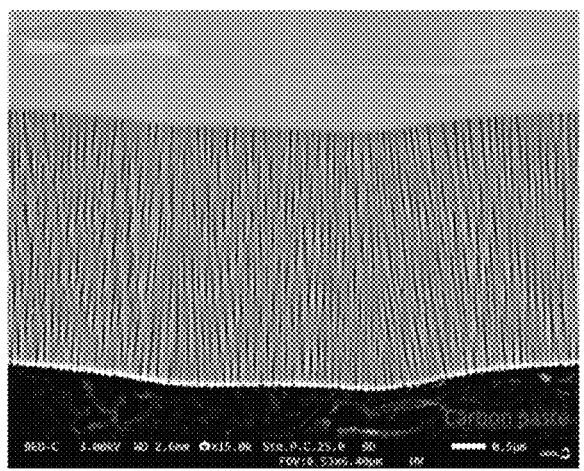

Preparation of nanoporous anodic aluminum oxide bare substrates shown in FIG. 5 and the SEM photos in FIG. 6 are synthesized according to the above-described prior art method as follows:

1. NAAO substrates were prepared by a two-step anodization using 0.3 M oxalic acid as an electrolyte at 0° C.-10° C. as previously described.Ref: Stępniowski, Wojciech & Nowak-Stępniowski, Agata & Michalska-Domańska, Marta & Norek, Magorzata & Czujko, Tomasz & Bojar, Zbigniew. (2014). Fabrication and geometric characterization of highly-ordered hexagonally arranged arrays of nanoporous anodic alumina. Polish Journal of Chemical Technology. 16. 63-692478. 10.2478/pjct-2014-0011. Ref: Law, Cheryl & Lim, Siew Yee & Abell, Andrew & Voelcker, Nicolas & Santos, Abel. (2018). Nanoporous Anodic Alumina Photonic Crystals for Optical Chemo and Biosensing: Fundamentals, Advances, and Perspectives. Nanomaterials. 8. 788. 10.3390/nano8100788.
2. Prior to anodization, high purity aluminum sheets (99.997%, 0.25 mm thick) were first cleaned, dried, and electropolished to remove most of the irregularities on the Al surface.
3. The first anodized layer was prepared at a voltage of 40V for four hours.
4. Once the porous alumina layer is formed atop the aluminum sheet, oxide removal was carried out for three hours (50-80° C.) using sodium thiosulfate and anhydrous sodium dichromate.
5. The final anodization step was carried out at 40V for two hours at a temperature of 0° C.
6. The final NAAO sheets were then reduced in size to individual 1×1 cm chips for the reflectance and SERS experiments.

Gold nanoparticles are synthesized according to the Lee and Meisel method (Lee, P. C. and Meisel, D. "Adsorption and surface-enhanced Raman of dyes on silver and gold sols" *J. Phys. Chem.* 1982, 86, 3391-3395). In the preferred embodiment the following steps in the order presented prepare the colloidal gold nanoparticles.

Aqueous Phase: spherical gold nanoparticles are prepared as follows:

1. A 250 mL Erlenmeyer flask is soaked in a base bath solution overnight. Glass vials (>10 mL) used in the protocol were also soaked, rinsed, and dried with nitrogen.
2. The nanoparticle reaction flask is rinsed with copious amounts of purified water before adding 200-300 mL of purified water and 0.05 to 0.06 grams $HAuCl_4$.
3. The lights are turned off to prevent any interaction with the gold salt.
4. The water is brought to boiling with moderate magnetic stirring on a hot plate.
5. Once boiling, the stirring is increased until a vortex is achieved in the solution.
6. Then, 0.05 to 0.06 grams sodium citrate is rapidly added to the solution, and boiling is continued with rapid stirring for 14 minutes.
7. The entire flask is removed from the hot plate, stir bar is removed, and the solution is cooled to room temperature.
8. The solution was then centrifuged down to a concentrate in plastic centrifuge tubes at 4000 rpm for 25 minutes per batch (1 batch=6 centrifuge tubes)
9. The supernatant containing water and dissolved ions is discarded, whereas the pellets from all test tubes containing gold nanoparticles is pipetted and combined into a separate vial.
10. The final concentration is then diluted by half before use in the three-phase layering steps.

Organic (oil phase): Micromolar dodecylamine hexane solution is used as follows:

1. A cleaned glass vial (>10 mL) is used to prepare a dodecylamine hexane stock solution.
2. The dodecylamine solid was completely dissolved in the hexane and mixed by swirling the vial for a few minutes at room temperature and then used to make a micromolar solution.
3. The micromolar dodecylamine hexane solution is prepared in another glass vial using the stock solution.
4. The dodecylamine hexane solution vials were tightly lidded when not in use to prevent evaporation of the organic.
5. A laser cut 1×1 cm bare NAAO was placed in a vented, polystyrene disposable petri dish which had a total container volume of 115 mL.
6. Prior to organic solution addition, 80 μL gold nanoparticle concentrated aqueous solution, was deposited onto the 1×1 cm NAAO substrate.
7. To establish the organic interface, the μM dodecylamine hexane solution was slowly added in the petri dish inches away from the substrate in order to not disturb the nanoparticle droplet.
8. Milliliters of the organic solution added to the petri dish, to submerge a portion of NP droplet but still allow protruding NP layer creating an air/water/hexane interface.

Air phase: Lidded at room temperature is used as follows:

1. Once the gold layer is formed atop the 1×1 cm NAAO, the petri dish is immediately lidded exposing the entire substrate to confined air and evaporating solvents in the closed dish.
2. The lidded petri dish holds the gold coated NAAO and organic solution during drying creating a more closed and controlled assembly conditions.
3. During fabrication and drying steps, the air phase was maintained at a temperature around room temperature (23° C.)
4. Assembly containers which were left open during the overnight drying process resulted in uneven drying of the gold layer.

Chemical cosolvent: ethanol is used as follows:

1. To induce gold layering, microliter volumes of ethanol were administered to the water/hexane interface using a sterile syringe at a rate of 1 drop per 20 s.
2. The smaller syringe tip allowed for more precise drops that caused less mechanical stress when added. It was very important that the addition of ethanol did not disturb the nanoparticle droplet on the NAAO.
3. Ethanol drops were administered at an approximate distance of 0.2 inches from the edge of the square substrate.

Figure 1:
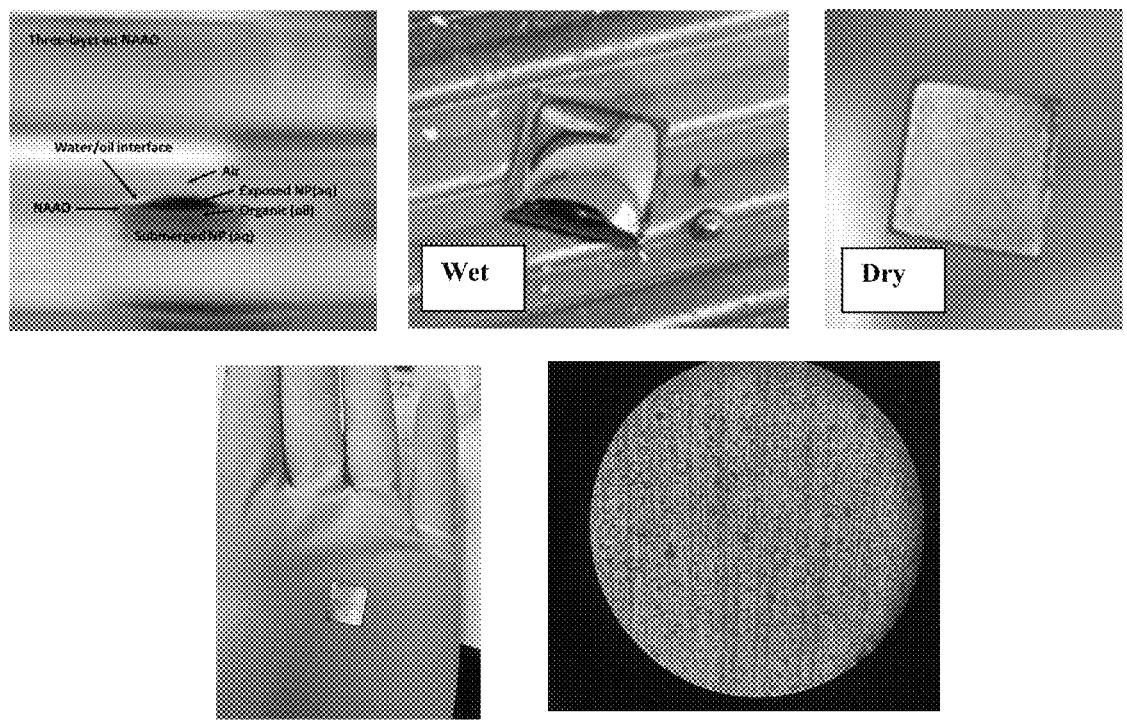
FIG. 1 shows several photographs of the SERS application process and structure of this disclosure.

As described above the preferred embodiment colloidal gold nanoparticle films are formed on nanoporous anodic alumina oxide substrates using a wet-chemical, three-phase ligand-exchange procedure carried out at room temperature. In FIG. 1 the top left is a photo of the three-phase assembly atop an individual NAAO in a plastic petri dish. The top middle is a photo of a wet assembled gold NP layer atop NAAO (wet). The top right is a photo of a NAAO after overnight drying. The bottom left is a photo of a 1×1 cm SERS-NAAO with respect to a hand. The bottom right is a photo of a microscope image of the surface.

The dried SERS-NAAO sensors are optically characterized with UV-Visible-NIR reflectance spectroscopy. The spectrum gives insight into the plasmonic coupling in the gold nanoparticle array and the optical response to the incident light when moving forward to laser induced excitation. The "dip" feature in the visible region is due to the surface plasmon absorption of the deposited gold nanoparticles, the surface plasmon peak. Another broad dip present in the NIR region results from the coupling of individual nanoparticles when forming the gold array in the layer. The dodecylamine brings the nanoparticles within nanometers of each other, causing the surface plasmons of nearby particles to hybridize creating a low energy mode for NIR excitation.

Figure 2:
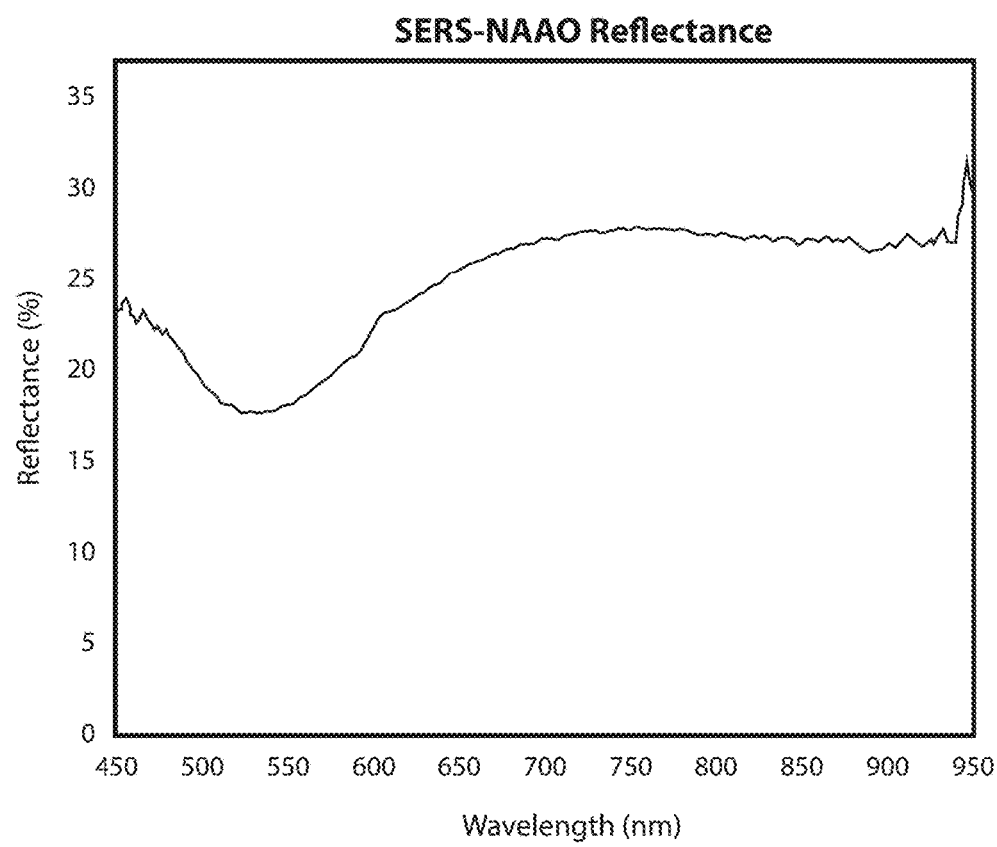
FIG. 2 shows a chart of the Reflectance spectrum of 1×1 cm SERS-NAAO of this disclosure.
Figure 3:
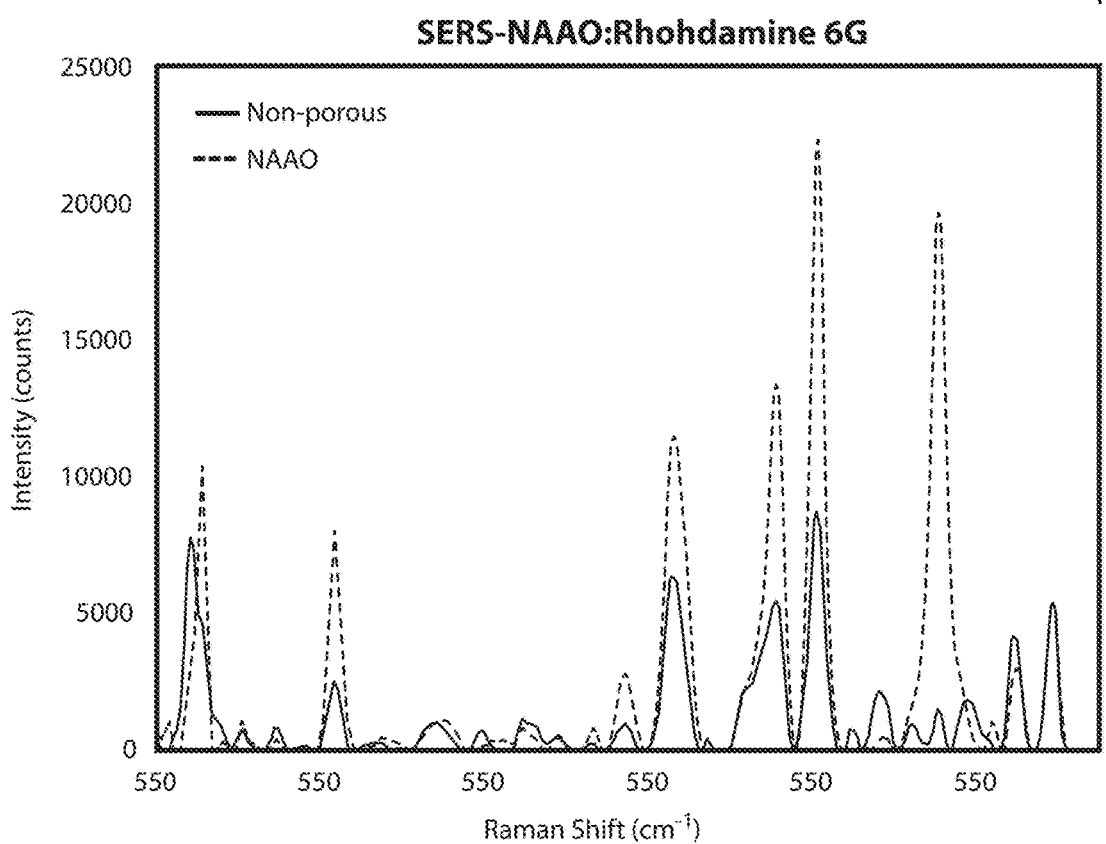
FIG. 3 shows a chart of a SERS of the preferred embodiment SERS spectrum for Rhodamine 6G on SERS-NAAO.

FIG. 2 shows a chart of the Reflectance spectrum of 1×1 cm SERS-NAAO of this disclosure. FIG. 3 shows a chart of a SERS of the prepared substrate Surface-Enhanced Raman Scattering preferred embodiment device compared to prior art. The SERS spectrum for $1\times10^{-4}$ M Rhodamine 6G was collected using the SERS-AAO.

Important Features of the preferred embodiment are as follows:
(1) The invention is a centimeter-scaled, gold-layered SERS-NAAO substrate scalable fabrication process based on the air-water-organic interfacial self-assembly of gold nanoparticles (NPs) into 2D arrays at the surface of a nanoporous alumina layer. It is an objective of the invention to provide a cost-effective SERS substrate fabrication for SERS application by combining gold nanoparticle colloidal solutions and non-lithographic (wet-chemical) protocols. An appropriate combination of surface structure, nanostructure morphology, and physical and chemical properties were determined.
(2) The assembly of aqueous nanoparticles into 2D films at the planar interface of two immiscible liquids has been widely explored in the literature through theoretical and experimental investigations of the multibody interactions between the particle, substrate, and interface interactions (ye, Ziwei & Li, Chunchun & Chen, Qinglu & Xu, Yikai & Bell, Steven. (2021). Self-Assembly of Colloidal Nanoparticles into 2D Arrays at Water-Oil Interfaces: Rational Construction of Stable SERS Substrates with Accessible Enhancing Surfaces and Tailored Plasmonic Response. Nanoscale. 13. 10.1039/D0NR08803J.).
(3) The air-water-hexane assembled gold nanoparticles provided localized electric fields at the interparticle gaps ("hot spots") of the nanoparticles. The alkylamine ligand implemented for the self-assembly and the size of the nanoparticles greatly contributed to the localized field.
(4) An alumina substrate surface was chosen as the platform for gold layering. The binding of the gold NPs onto the surface depends largely on the surface species provided by alumina, therefore, we have taken great care in choosing a simple gold assembly method where an alkylamine-functionalized nanoparticle has favorable interactions with the hydroxyl groups at the surface of alumina. Here, strict fabrication parameters were created to form ordered nanopores, to induce an efficient in-situ ligand exchange, to create a uniform gold layer, and to preserve the integrity of the gold layer after drying.
(5) An ordered nanoporous alumina layer is grown atop an aluminum substrate using a scalable wet-chemical two-step anodization process. Before gold layering, the resulting NAAO structure is multilayered, $Al_2O_3/Al$.
(6) An air-water-organic in-situ alkylamine ligand exchange, induced by a reduction in electrostatic repulsive forces, drives the self-assembly of negatively charged citrate-capped spherical NPs.
(7) An efficient self-assembly of the gold NPs is promoted by (a) concentrated aqueous spherical gold nanoparticles layer, (b) micromolar concentration of the alkylamine-hexane organic layer, (c) partially controlled air phase within a triple vented, lidded polystyrene container, (d) slow evaporative drying at room temperature.

Since certain changes may be made in the above-described method of using colloidal gold nanoparticles deposited on anodic alumina oxide for Surface-enhanced Raman Scattering (SERS) without departing from the scope of the invention herein involved, it is intended that all matter contained in the description thereof shall be interpreted as illustrative and not in a limiting sense.

What is claimed is:

1. A method to synthesize colloidal gold nanoparticles on Anodic Alumina Oxide substrates for Surface-enhanced Raman Scattering comprising:
    soaking a 250 mL Erlenmeyer flask in a base bath solution overnight;
    thoroughly rinsing said flask with purified water and creating a solution by adding 200-300 mL of purified water and 0.05 to 0.06 grams $HAuCl_4$;
    turning off any lights to prevent any interaction with gold salt;
    bringing said solution to a boil with moderate magnetic stirring on a hot plate;
    once boiling, the stirring is increased until a vortex is achieved in said solution;
    then rapidly adding 0.05 to 0.06 grams sodium citrate to said solution, and continue boiling with rapid stirring for 14 minutes;
    removing said flask from the hot plate and cooling said solution to room temperature;
    cooling said resulting solution containing colloidal gold nanoparticles in a refrigerator;
    once cooled, measuring said colloidal gold nanoparticles solution with absorption spectroscopy to confirm the presence of a surface plasmon peak;
    centrifuging said colloidal gold nanoparticles solution in plastic centrifuge tubes at 4000 rpm for 25 minutes for a batch comprising 6 plastic centrifuge tubes; and,
    forming colloidal gold nanoparticle films on nanoporous anodic alumina oxide substrates using a wet-chemical, three-phase ligand-exchange procedure carried out at room temperature.

* * * * *